March 10, 1970 W. O. O'NEAL 3,499,578
BEVERAGE DISPENSING SYSTEMS
Filed Jan. 12, 1966 3 Sheets-Sheet 1
FIG. 1.
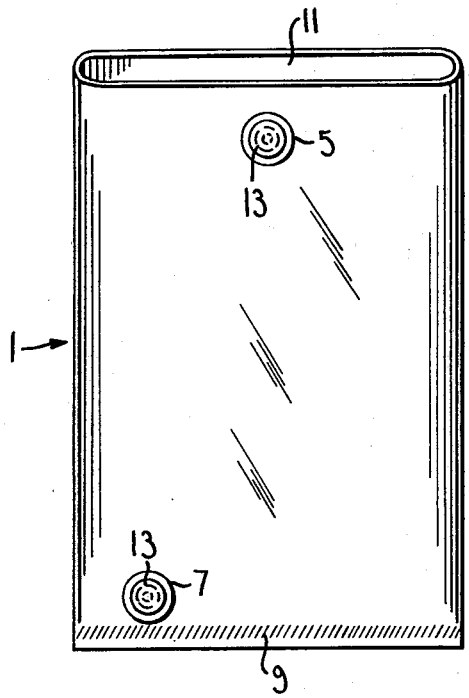
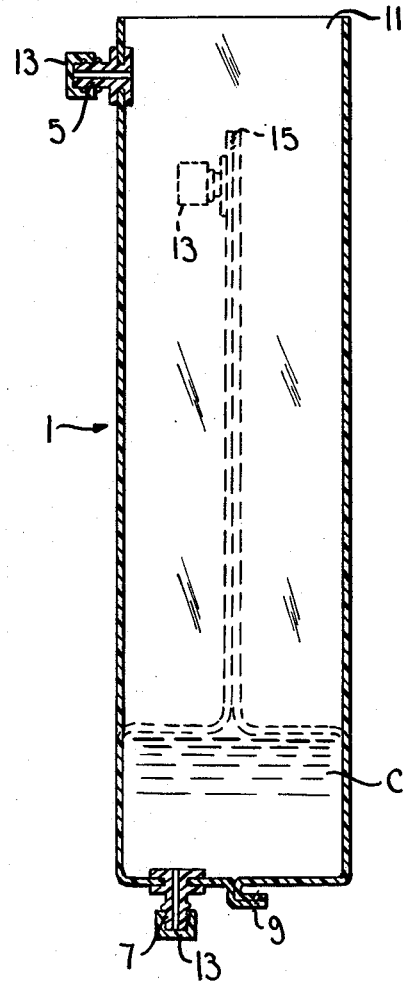
FIG. 3.
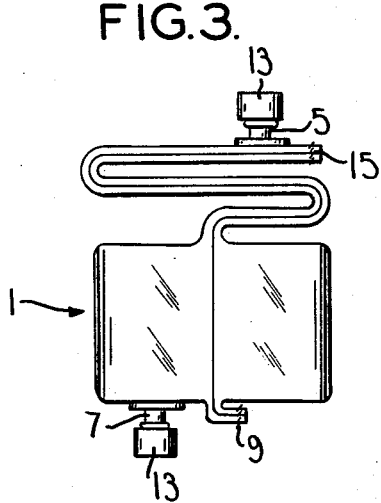
FIG. 2.
Wilbert O. O'Neal,
Inventor.
Koenig, Senniger, Powers and Leavitt,
Attorneys.

March 10, 1970  W. O. O'NEAL  3,499,578
BEVERAGE DISPENSING SYSTEMS
Filed Jan. 12, 1966  3 Sheets-Sheet 3

United States Patent Office 3,499,578
Patented Mar. 10, 1970

3,499,578
BEVERAGE DISPENSING SYSTEMS
Wilbert O. O'Neal, Crystal City, Mo., assignor to Universal Match Corporation, St. Louis, Mo., a corporation of Delaware
Filed Jan. 12, 1966, Ser. No. 520,216
Int. Cl. B67d 5/08
U.S. Cl. 222—56                                    3 Claims

ABSTRACT OF THE DISCLOSURE

A beverage dispenser holding two packages partially filled with a beverage concentrate. Water is added to the packages and the flow of the reconstituted beverage into a dispensing reservoir is controlled by valves which provide for complete dispensing from one package before the other.

---

This invention relates to beverage dispensing systems, and more particularly to systems of dispensing beverages reconstituted from beverage concentrates.

The term "beverage concentrate" as used herein means a concentrated beverage ingredient which is adapted to be reconstituted as a beverage by the addition of water, or to be reconstituted as a liquid concentrate by the addition of some water, the liquid concentrate then being reconstituted as a beverage by the further addition of water. It includes frozen concentrates, such as frozen orange juice concentrate, and soluble dry concentrates, such as instant coffee concentrates.

The principles of the invention are particularly adapted for the dispensing of orange juice reconstituted from frozen orange juice concentrate. Heretofore, in the dispensing of orange juice, it has been customary to utilize the so-called pre-mix system of dispensing, according to which dispensing machines adapted to dispense orange juice from pre-mix tanks are installed by the dispensing machine route operator at various locations, the tanks being filled with orange juice (reconstituted from frozen concentrate) at the operator's plant, trucked to the locations, and connected into the machines at the locations. Empty tanks are taken out of the machines and trucked back to the plant where they have to be cleaned before reloading. Among the several objects of the invention may be noted the provision of a novel system for the dispensing of orange juice and other beverages, reconstituted from concentrate, which eliminates the necessity for transporting heavy tanks of pre-prepared beverage to locations and returning and cleaning the tanks, involving, instead, only the transport to locations of concentrate per se in relatively small conveniently handled packages (which may be disposable), the water for reconstituting the concentrate being added to the packages at the locations, and the reconstituted concentrate being dispensed from the packages (which may be thrown away when empty); and the provision of packages of concentrate suitable for this purpose, to which water may be added at the locations to reconstitute the concentrate, and from which the reconstituted concentrate may be dispensed.

The principles of the invention are also adapted to the dispensing of beverages, such as coffee, reconstituted from a dry soluble concentrate, where it is desirable to convert the dry concentrate to a liquid concentrate in the dispensing machine, dispense the liquid concentrate into a mixer or a cup, and add hot water to the liquid concentrate in the mixer or the cup to complete the reconstitution of the original dry concentrate in two steps. This may be considered as involving partial reconstitution of the concentrate in the package, and completion of reconstitution of the concentrate in the machine outside the package.

A further object of the invention is the provision of dispensing apparatus suitable for handling the dispensing from packages of reconstituted concentrate, particularly orange juice, and which enables dispensing from a plurality of packages with suitable control over the flow of the reconstituted concentrate, with provision for dispensing from the packages on a first-in, first-out basis, and assurance of a full dispense on the last dispense, the apparatus shutting off when less than a full dispense remains therein. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in elevation of a plastic bag such as may be used for holding a concentrate in accordance with this invention;

FIG. 2 is a vertical section showing how the bag is partially filled with the concentrate, also showing in dotted lines how the empty part of the bag is flattened out and sealed;

FIG. 3 is a view showing the final package of concentrate;

Corresponding reference characters indicate corresponding parts throughout the several views of the drawings.

Figure 4:
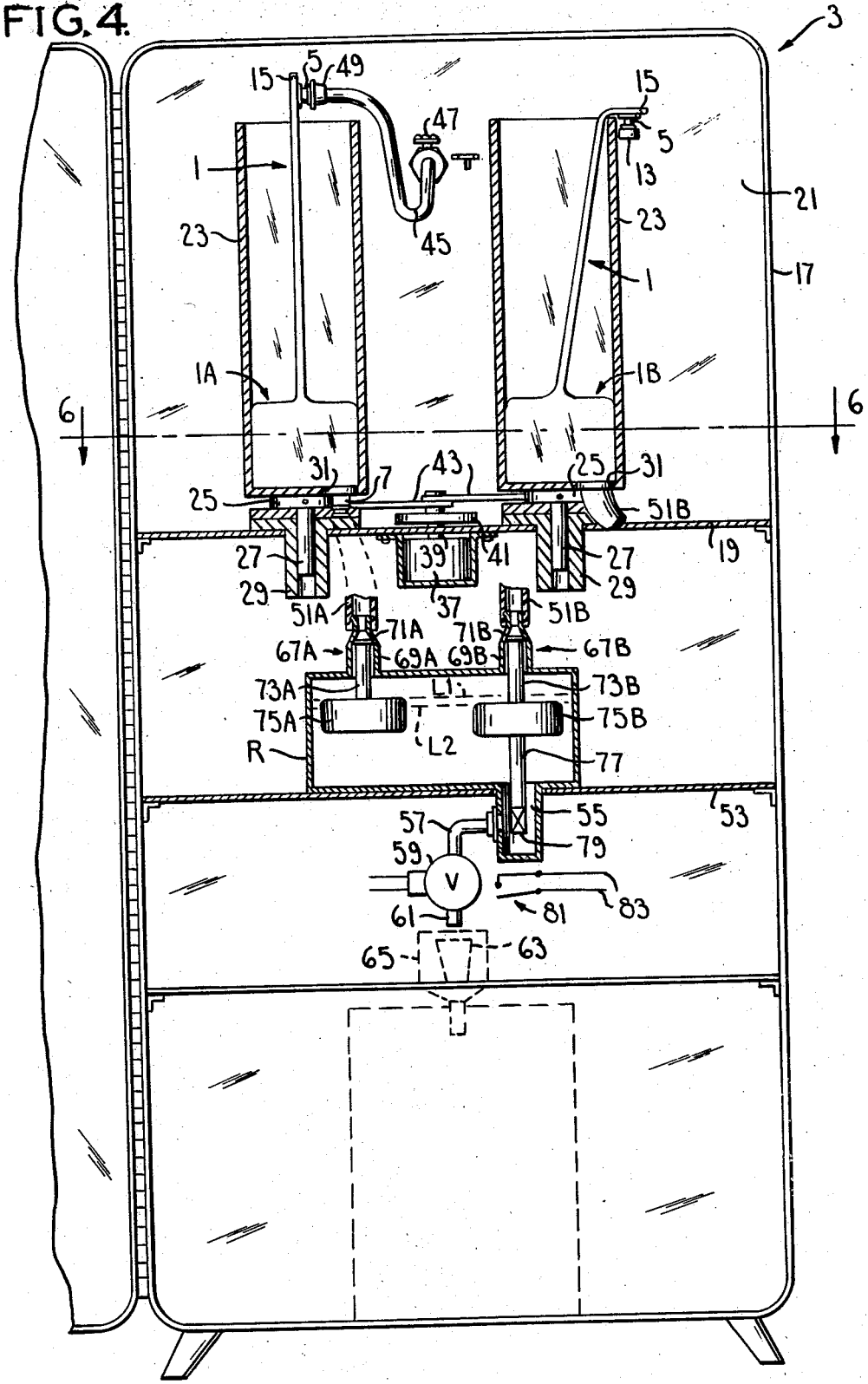
FIG. 4 is a vertical section of a dispensing machine which may be utilized in the system of the invention, showing two bags of concentrate placed in the machine ready for being filled with water.

Basically, the beverage dispensing system of this invention involves the novel method of dispensing beverage from a beverage dispenser on location comprising the packaging of a beverage concentrate C in a water-tight bag, such as the bag 1 shown in FIGS. 1-3, with the concentrate only partly filling the bag to leave room for the addition of water to the bag to reconstitute the concentrate. The bag with the concentrate therein is delivered to the location. Water is added to the bag at the location to reconstitute the concentrate in the bag, and the reconstituted concentrate is dispensed from the bag in the dispenser. The dispenser would typically be a coin-operating vending machine, but it is contemplated that the method is applicable to the servicing of noncoin manual dispensers.

Two modes of utilizing the system are contemplated. In the first of these, particularly suitable for dispensing orange juice or the like, which is to be reconstituted from a frozen concentrate, the bag is made of such size as to enable filling it with sufficient water completely to reconstitute the concentrate in the bag as the final beverage to be dispensed. Thus, if the frozen concentrate is such as to require addition of four parts of water to one part of concentrate, the bag may be a five gallon bag packed with one gallon of concentrate, leaving room for the addition of the requisite four gallons of water. The packing of bags with the frozen concentrate would be carried out preferably by the concentrate producer for delivery to the route operator's plant, bags containing frozen concentrate being taken out of cold storage at the operator's plant for delivery to locations and allowed to thaw out before the ultimate addition of water thereto. In the second mode of utilization of the system, particularly suitable for dispensing coffee to be reconstituted from a dry soluble concentrate (e.g., freeze-dried instant coffee concentrate), the bag may be made of a size for addition of only a relatively small amount of water sufficient only to reconstitute the dry concentrate as a liquid concentrate, for being dispensed into a mixer or cup where hot water is added to complete the reconstitution of the concentrate into the final (hot) beverage.

The bag 1 may be a polyethylene bag, for example, and as shown in FIGS. 1–3 is provided with a fitting 5 adapted for connection of a hose for delivering water to the bag to fill it and a fitting 7 adapted for connection of a hose to drain the liquid beverage product from the bag. As illustrated, the bag may consist of a length of polyethylene tubing initially made with a heat seal 9 at the bottom and with an open mouth 11. The filling fitting 5 for connection of the water hose is located near the top of the bag. The drain fitting 7 for connection of the beverage product delivery hose is located at the bottom of the bag. Each fitting is shown as initially provided with a cap 13. The concentrate C may be poured into the bag via the open bag mouth, after which the empty upper part of the bag is flattened out as shown in dotted lines in FIG. 2 and closed at the top as by heat-sealing as indicated at 15 in FIGS. 2 and 3, after which the flattened upper part of the bag may be folded to lie flat on the top of the filled lower part of the bag as shown in FIG. 3. In the case of frozen juice concentrates, such as frozen orange juice concentrate, the concentrate may be poured into the bag in liquid or semiliquid state, the bag sealed, and the concentrate then frozen solid in the bag. It is also contemplated that the concentrate may be injected into a completely sealed collapsed bag, the concentrate expanding the bag as it is delivered into the bag, thus avoiding entrapment of air in the bag.

Figure 5:
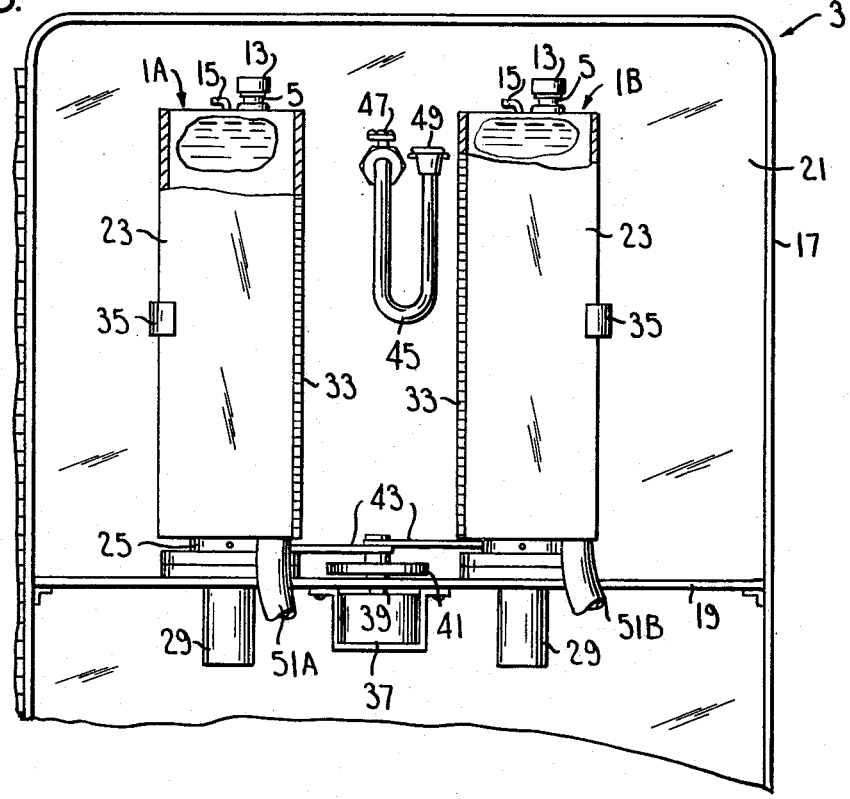
FIG. 5 is a fragment of FIG. 4 showing the two bags after filling.
Figure 6:
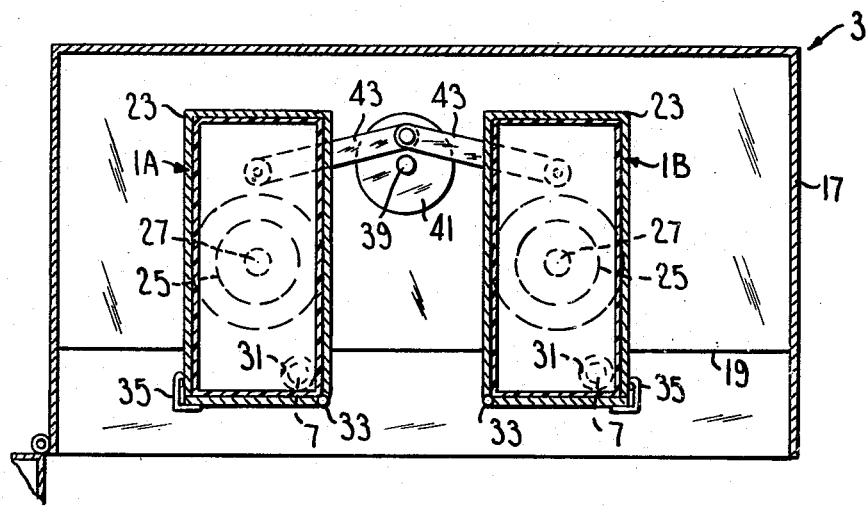
FIG. 6 is a horizontal section on line 6—6 of FIG. 4.

Referring to FIGS. 4–6, the dispensing machine 3 is shown as one for holding two bags of frozen orange juice concentrate in accordance with the first mode of utilization of the system of this invention, as above outlined, and is adapted for agitating the bags in order to keep the nonsoluble solids of the orange juice in suspension in the beverage. As illustrated, the machine comprises a cabinet 17 having a shelf 19 toward the top defining an upper compartment 21 in the cabinet. Two oscillating bag holders each designated 23 are housed in this compartment. Each bag holder, as illustrated, comprises a container of rectangular shape in plan. The bottom of each container 23 is secured to a disk 25 at the upper end of a short vertical shaft 27 journalled in a thrust bearing 29 carried by the shelf 19. Outward of the disk, the bottom of the container has a hole 31 for reception of the drain fitting 7 of a bag 1 placed in the container. One side of each container may be hinged as indicated at 33 to constitute a front door for the container adapted to be opened for placing a bag in the container and latched in closed position by means of a suitable latch 35. Means for oscillating the containers on the vertical axes of shafts 27 is shown to comprise an electric motor-speed reducer unit 37 driving a vertical shaft 39 carrying a crank disk 41 linked as indicated at 43 to the bottoms of the containers.

The containers 23 are open at the top so that the tops of the bags 1 carrying the filling fittings 5 are accessible at the top of the containers as appears in FIG. 4. At 45 is indicated a filling hose which extends from a valve 47 mounted in the back wall of the dispensing machine cabinet between the containers. Valve 47 has its inlet connected to a source of water. Hose 45 has a coupling 49 at its end for detachably coupling it to the filling fittings of the bags in the containers 23. The arrangement is such that the filling hose 45 may be coupled to the filling fitting of one bag and valve 47 turned on to fill the bag with water, after which the valve is turned off, the hose uncoupled from the filling fitting of the first bag and coupled to the filling fitting of the second bag, after which the valve is turned on to fill the second bag with water. Since the empty upper part of each bag was flattened out before the top of the bag was sealed, the bag may be filled with water as described without any necessity for venting air from the bag. The source of water may be a storage tank (not shown) provided in the cabinet 17, which would be refrigerated for pre-chilling the water for filling the bags. The storage tank may be refilled via a restricted tap water line which delivers water to the tank slowly enough to minimize refrigeration loading. Slow refill in this manner also minimizes dilution of chilled water in the tank with warm tap water. Also, only a small addition of water may be made during the time chilled water flows from the tank into a bag.

Before the bags 1 in containers 23 are filled with water, the caps 13 on the drain fittings 7 of the bags are removed and flexible beverage delivery hose lines 51A and 51B are detachably connected to these fittings. These delivery hose lines extend to an auxiliary reservoir R for beverage to be dispensed in a system for controlling the flow of the beverage, for providing first-in, first-out dispensing from the two bags, and for insuring a full dispense on the last dispense, the machine shutting down when out of beverage.

The reservoir R is mounted in the cabinet on a shelf 53 below the shelf 19 for gravity flow of beverage thereto from the bags. It has a well 55 which extends down through a hole in the shelf 53. A delivery hose line 57 extends from this well to the inlet of a solenoid-operated dispensing valve 59, this valve having an outlet 61 for directing beverage into a cup 63 at a cup station 65 in the machine. Hose line 57 and dispensing valve 59 constitute means for dispensing the reconstituted concentrate from the reservoir. Generally, valve 59 is timer-controlled to open for a predetermined time so related to the head of beverage in the reservoir as to dispense one cup of beverage.

First and second valves 67A and 67B are provided for controlling the flow of beverage from the respective bags (which are specially designated 1A and 1B in FIGS. 4–6) to the reservoir. Valve 67A comprises an inlet fitting 69A extending upward from the top of the reservoir, this fitting being tapered to provide a valve seat at 71A, and valve 67B comprises a similar fitting 69B providing a valve seat 71B. Valve 67A comprises a stem 73A having a float 75A at its lower end, and valve 67B comprises a somewhat longer stem 73B having a float 75B at its lower end. Line 51A is detachably connected to the upper end of fitting 69A and line 51B is detachably connected to the upper end of fitting 69B. The arrangement is such that valve 67A opens when beverage in the reservoir falls below a first level L1, and closes when beverage in the reservoir rises to this level; valve 67B opens when beverage in the reservoir falls below a second and somewhat lower level L2, and closes when beverage in the reservoir rises to lever L2. Closure of the valves is effected by engagement of the upper ends of their stems with the valve seats. The reservoir has a capacity which is much smaller than that of a bag 1, and the difference in levels L1 and L2 is somewhat greater than one cup.

With the above-described arrangement, at the start of dispensing, with reservoir R empty, after bags 1A and 1B have been placed in containers 23 and filled with water, and hose lines 51A and 51B interconnected between the bags and the reservoir inlet fittings 69A and 69B, the reservoir will be filled from both bags until valve 67B closes when the beverage in the reservoir reaches level L2, then from bag 1A until the beverage in the reservoir reaches level L1. This drains off only a relatively small amount of beverage from the bags, leaving substantial supplies of beverage therein. It may be desirable to pinch the lines 51A and 51B for a time while oscillating the bags so that beverage delivered to the reservoir is well mixed. If desired, an agitator (not shown) may be provided in the reservoir to keep beverage therein better agitated. Each time dispensing valve 59 is opened to dispense a drink, the level of beverage in the reservoir drops below level L1. Valve 67A opens to bring the level back up to L1 as long as there is beverage in bag 1A, but valve 67B remains closed to hold back the beverage in bag 1B. After the supply of beverage in bag 1A is exhausted, each time dispensing valve 59 is opened to dispense a drink, the level of beverage in reservoir R drops below L2 and valve 67B opens to bring the level back up to L2. In this way, dispensing proceeds first from bag 1A, then, when the supply in bag 1A is exhausted, from bag 1B.

Means is provided for shutting off the dispenser when the supplies in both bags 1A and 1B have been exhausted, and when the level of beverage in the reservoir R has been drawn down below the one cup level. As shown in FIG. 4, this means may comprise a rod 77 extending down from the float 75B into the well 55, this rod having a magnet 79 on its lower end which, on downward movement when the level of beverage in the reservoir is drawn down below the one cup level, actuates a magnetically responsive switch 81 (a "sold-out" switch) connected in a circuit 83 for actuating means (not shown) for preventing the vendor from accepting coins.

The difference in levels L1 and L2 is relatively minor in relation to the total head of beverage from the reservoir down to the dispensing valve 59, so that valve 59 may be timer-controlled to open for a predetermined time in relation to the average head of beverage to provide for delivery of a substantially constant quantity of beverage to the cups on successive ends.

If a serviceman arrives to service the dispenser before bag 1B is empty, he may leave bag 1B in place, put in a fresh bag 1A, and interchange hose lines 51A and 51B (i.e., connect bag 1B to valve 67A and bag 1A to valve 67B) to provide for first-in, first-out dispensing. Empty bags can be simply thrown away.

It will be understood that the principles of the dispensing machine shown in FIGS. 4-6 may be applied to a machine for dispensing a beverage such as coffee reconstituted from a dry soluble concentrate. In such case, the bags 1 of dry coffee concentrate put into containers 23 would have only sufficient water added thereto to convert the dry concentrate to a liquid concentrate. This liquid concentrate would be dispensed in small amount less than one cup into a cup 63, and the machine would include means for adding hot water to the liquid concentrate in the cup to complete the reconstitution of the original dry concentrate.

In view of the above, it will be seen that the several objects of the invention are achieved and other advantageous results attained.

What is claimed is:

1. A beverage dispenser comprising means for holding two packages each containing a quantity of beverage concentrate with the concentrate only partially filling each package to leave room for the addition of water thereto to reconstitute the concentrate, means in the dispenser for supplying water to the packages, means for agitating the holding means to agitate the reconstituted concentrate in the packages, means for dispensing the reconstituted concentrate from the packages including a reservoir for receiving reconstituted concentrate from the packages, means for dispensing the reconstituted concentrate from the reservoir means detachably connecting the packages to the reservoir, and valve means responsive to the level of reconstituted concentrate in the reservoir for effecting completion of dispensing from one package before the other.

2. A beverage dispenser having means for replaceably holding a first supply of a beverage product and means for replaceably holding a second supply of the same beverage product, a reservoir for receiving beverage product from said supplies, means for detachably connecting the supplies to the reservoir, means for dispensing beverage product from the reservoir, first valve means controlling the flow of product from the first supply to the reservoir responsive to drop of product in the reservoir below a first level for flow of product from the first supply to the reservoir until said first level is restored, and second valve means controlling the flow of product from the second supply to the reservoir responsive to drop of product in the reservoir below a second level which is lower than the first level for flow of product from the second supply to the reservoir until said second level is restored.

3. A beverage dispenser as set forth in claim 2 wherein each valve means comprises a float valve, and having means operable by the second float valve on depletion of the supply of product in the reservoir to shut off the dispenser.

References Cited

UNITED STATES PATENTS

| | | | |
|---|---|---|---|
| 3,237,808 | 3/1966 | Witt et al. | 222—64 |
| 3,185,348 | 5/1965 | Pollak et al. | 222—129.1 X |
| 2,918,377 | 12/1959 | Hurley et al. | 99—171 |
| 2,890,643 | 6/1959 | King | 99—283 |
| 2,613,488 | 10/1952 | Attride | 99—193 X |

A. LOUIS MONACELL, Primary Examiner

S. B. DAVIS, Assistant Examiner

U.S. Cl. X.R.

99—28, 171, 275; 222—129.1, 161